United States Patent
Bie et al.

(10) Patent No.: US 12,299,473 B2
(45) Date of Patent: May 13, 2025

(54) DEPENDENCY INJECTION WITH AUTO-SERIALIZATION IN MULTIPLE WORKER SYSTEM

(71) Applicant: HULU, LLC, Santa Monica, CA (US)

(72) Inventors: Rui Bie, Beijing (CN); Han Qin, Beijing (CN); Jian Ren, Beijing (CN)

(73) Assignee: HULU, LLC, Santa Monica, CA (US)

( * ) Notice: Subject to any disclaimer, the term of this patent is extended or adjusted under 35 U.S.C. 154(b) by 896 days.

(21) Appl. No.: 17/491,356

(22) Filed: Sep. 30, 2021

(65) Prior Publication Data

US 2023/0094029 A1 Mar. 30, 2023

(51) Int. Cl.
*G06F 9/46* (2006.01)

(52) U.S. Cl.
CPC .................................. *G06F 9/465* (2013.01)

(58) Field of Classification Search
CPC ....................................................... G06F 9/465
See application file for complete search history.

(56) References Cited

U.S. PATENT DOCUMENTS

| | | | |
|---|---|---|---|
| 2016/0266875 A1* | 9/2016 | Takahashi | G06F 8/71 |
| 2018/0342324 A1* | 11/2018 | Cha | C09K 11/70 |
| 2020/0192662 A1* | 6/2020 | Hu | G06F 8/76 |
| 2021/0232371 A1* | 7/2021 | Waite | G06F 8/36 |

OTHER PUBLICATIONS

"RDD Programming Guide"—Spark 2.4.8 Documentation; https://spark.apache.org/docs/2.4.8/rdd-programming-guide.html#/broadcast-variables; 19 pages; Sep. 7, 2021.
Apache Spark is a unified analytics engine for large-scale data processing; https://spark.apache.org/, 5 pages, Sep. 30, 2021.
"Dependency Injection" from Wikipedia Website; https://en.wikipedia.org/wiki/Dependency_injection; 15 pages, Aug. 23, 2021.
"Google/guice"; https://github.com/google/guice; 3 pages, Sep. 30, 2021.
Spring, "Core Technologies"; https://docs.spring.io/spring-framework/docs/current/reference/html/core.html; 396 pages, Sep. 30, 2021.
(Continued)

*Primary Examiner* — Tammy E Lee
(74) *Attorney, Agent, or Firm* — Kwan & Olynick LLP

(57) ABSTRACT

In some embodiments, a system performs a service using a plurality of compute nodes. A second compute node installs a dependency injection container to manage a dependency graph of dependencies for classes in an application. The dependency injection container is determined from a first compute node in the plurality of compute nodes that manages performing the service with the plurality of compute nodes. The second compute node receives information identifying a node in the dependency graph from the first compute node. The information is received to create a first object that has been created on the first compute node. The second compute node uses the information to determine a first class for the node in the dependency graph and a dependency on a second class and creates the first object of the first class with the dependency on a second object of the second class on the second compute node.

20 Claims, 13 Drawing Sheets

(56) References Cited

OTHER PUBLICATIONS

Spark 2.4.4—"Spark Streaming Progammming Guide";https://spark.apache.org/docs/2.4.4/streaming-programming-guide.html#checkpointing; 34 pages, Sep. 30, 2021.
"Multi-armed bandit" from Wikiepdia webiste; https://en.wikipedia.org/wiki/Multi-armed_bandit; 18 pages, Sep. 10, 2021.
Lihong Li, et al.; A Contextual-Bandit Approach to Personalized News Artice Recommendation; https://arxiv.org/pdf/1003.0146.pdf; 10 pages, Mar. 1, 2012.
"Object-Oriented Progamming" from Wikipedia website; https://en.wikipedia.org/wiki/Object-oriented_programming; 18 pages, Sep. 30, 2021.
Manning, Dependency Injection Principles, Practices, and Patterns;https://www.manning.com/books/dependency-injection-principles-practices-patterns?; 3 pages.

* cited by examiner

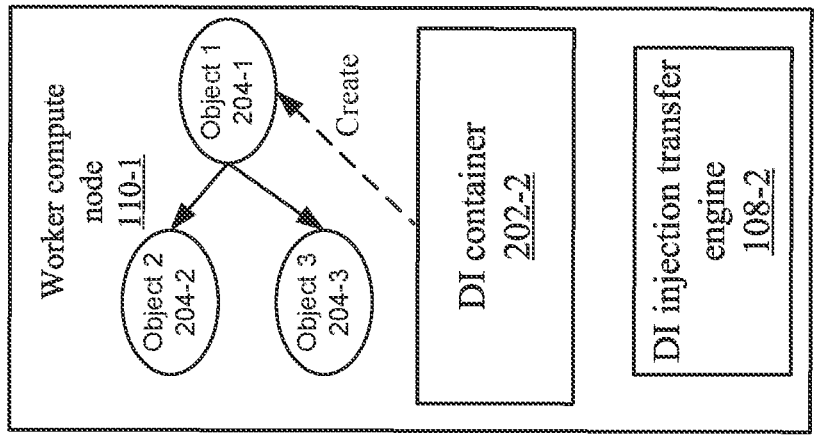
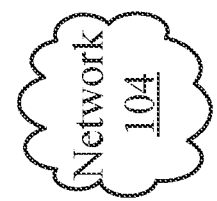
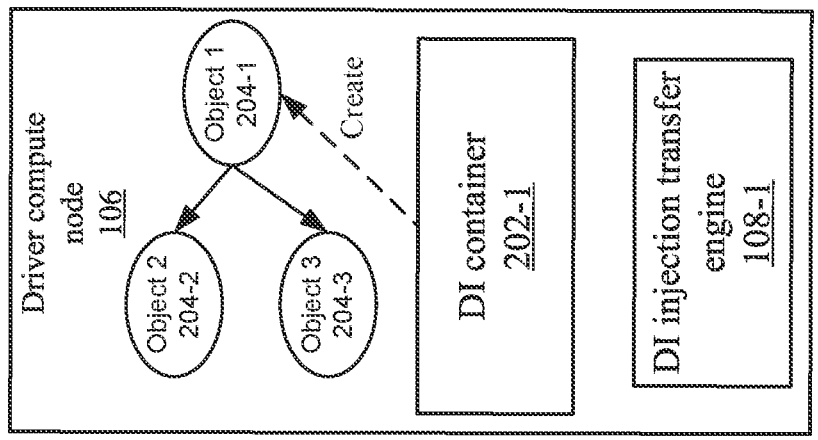
FIG. 8

```
interface Medium1
interface Medium2 interface Lower1
interface Lower2
interface Lower3
                         ⌐1002
Class Upper1 {                    ⌐1006
        private Medium1 medium1;
        private Medium2 medium2;    ⌐1004
        // code here
}

Class Medium1impl1 impllements Medium1 {
        private Lower1 lower1;          ⎫
        private Lower2 lower2;          ⎬ 1012
        // code here                    ⎭
}

Class Medium2impl1 impllements Medium2 {
        private Lower2 lower2;          ⎫
        private Lower3 lower3;          ⎬ 1014
        // code here                    ⎭
}

Class Lower1impl1 impllements Lower1 {
        // code here
}

Class Lower2impl1 impllements Lower2 {
        // code here
}

Class Lower3impl1 impllements Lower3 {
        // code here
}
```

1008 — Class Medium1impl1 block
1010 — Class Medium2impl1 block
1016 — Class Lower1impl1 block
1018 — Class Lower2impl1 block
1020 — Class Lower3impl1 block

FIG. 10

DEPENDENCY INJECTION WITH AUTO-SERIALIZATION IN MULTIPLE WORKER SYSTEM

BACKGROUND

Dependency injection (DI) may be used in an application (e.g., an application developed using object-oriented programming languages) to separate the responsibility of "usage" from the responsibility of "construction". This allows modules to evolve independently of the implementation of services. In this way, dependency injection is a technique in which an object receives services from other objects that it depends on through dependencies at run-time. The object can depend on the service, but is not responsible for the implementation of the service. The separation of the use of the objects and the construction of the objects allows the reuse of software code.

The use of dependency injection is typically performed in a single compute node (e.g., a single process). However, when a multiple compute node system is used, the objects with their dependencies are passed across a network to other compute nodes. Any information passed between the two compute nodes needs to be serialized and sent across the network. The serialization may convert the data into bytes of a bitstream, and the bitstream is sent across the network. When the bitstream is received at the receiving data compute node, the receiving data compute node may de-serialize the bitstream and install the objects with their dependencies between the objects. Not all objects may be serializable, though. To make objects serializable, some adjustments to the definitions of the objects may be needed. This may require manual work to adjust the objects, which may be time-consuming. Also, designing the objects to be serializable may be burdensome for a designer.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments, in accordance with the present disclosure, may be practiced. Similar or same reference numbers may be used to identify or otherwise refer to similar or same elements in the various drawings and supporting descriptions. In the accompanying drawings:

FIG. 8 depicts an example of the creation of objects on a worker compute node according to some embodiments.

FIG. 10 depicts an example of software code for an application according to some embodiments.

DETAILED DESCRIPTION

Figure 1:
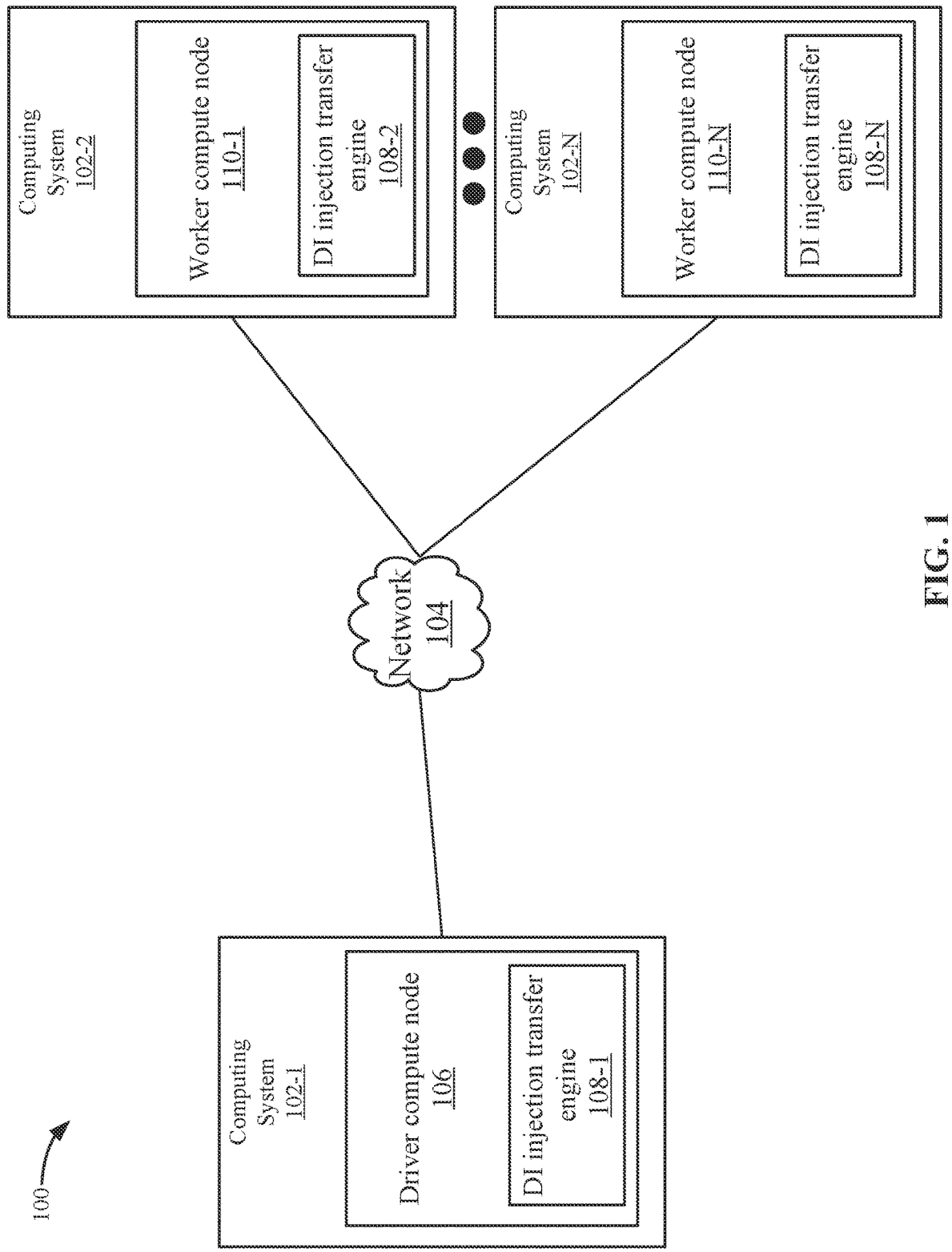
FIG. 1 depicts a simplified system for performing dependency injection (DI) in a multiple worker system according to some embodiments.

Described herein are techniques for a computing system. In the following description, for purposes of explanation, numerous examples and specific details are set forth to provide a thorough understanding of some embodiments. Some embodiments as defined by the claims may include some or all the features in these examples, alone or in combination with other features, described below and may further include modifications and equivalents of the features and concepts described herein.

In a system that uses dependency injection (DI), a DI container may manage the dependencies between classes/objects using a dependency graph for the system. Then, the DI container uses an object creation method to create the objects in a data compute node based on the dependencies found in the dependency graph. An object that has a dependency on another object uses operations performed by the other object. The objects may form a runtime version of the application to provide an overall service.

Some systems may include multiple data compute nodes that perform services, such as process tasks for a service, in parallel. For example, the system may include a driver data compute node and worker data compute nodes. The driver data compute node may coordinate tasks that are performed by the worker data compute nodes. The driver data compute node receives the output of the worker data compute nodes that perform the tasks, and may combine the output to provide an overall output for the service.

Each worker data compute node may require the objects and dependencies that are running on the driver data compute node to be created on the worker data compute node. As mentioned above in the Background, serializing the objects and dependencies may be problematic. In contrast to serializing the objects and the dependencies, the system may serialize information to create the DI container and send that information over the network to worker data compute nodes. Then, the worker data compute nodes may de-serialize the information and create the same DI container on each worker data compute node. When an object is created by a DI container and needs to be transferred to another data compute node, such as from the driver data compute node to the worker data compute node, instead of serializing the object itself and its dependencies, the system serializes the object creation method for the object. In some examples, the object creation method may identify the corresponding node in the dependency graph for the object, but not include the object itself (e.g., the properties of the object). When the worker data compute node receives the object creation method, the DI container may use the dependency graph to identify node in the dependency graph for the object and create the same object on the worker data compute node with any other objects that that object depends on by determining corresponding nodes in the dependency graph for objects and creating the objects.

Serializing the object creation method may transfer less data than transferring the properties of the object and the dependencies, which may allow the transfer to be faster and more efficient. Further, not having to serialize the properties and dependencies means the objects do not need to be serializable, which may remove some manual work to make the objects serializable.

System Overview

FIG. 1 depicts a simplified system 100 for performing dependency injection in a multiple worker system according to some embodiments. System 100 includes multiple computing systems 102-1 to 102-N. It is noted that computing systems 102-1 to 102-N may be running on the same physical machine or different physical machines, and also can be physical or virtual computing systems. Computing systems 102 may include processes that are running on them that may be referred to as compute nodes. Compute nodes may be virtual machines, containers, physical computing devices, or other processes. The compute nodes can execute software code for applications.

In some embodiments, a driver compute node 106 and worker compute nodes 110-1 to 110-N are instantiated on respective computing systems 102-1 to 102-N. A system may use an application running on driver compute node 106 and worker compute nodes 110 to perform a service. The application may be compiled in binary files and distributed to driver compute node 106 and worker compute nodes 110. The service may require processing of data that may be larger than a single compute node can handle. Driver compute node 106 and worker compute nodes 110 may interact to complete the service, which may involve execution of software code of the application to perform the service.

Driver compute node 106 may coordinate the performance of the service among worker compute nodes 110. For example, driver compute node 106 may assign tasks for a service to worker compute nodes 110, which may respectively perform the task for the service. The task may perform a portion of what is needed to be performed for the service. The multiple compute nodes may perform at least a portion of the tasks in parallel. After performing the tasks, worker compute nodes 110 may provide the output back to driver compute node 106. Then, driver compute node 106 may combine the outputs to generate a final output for the service. Although this system is described, other systems that include multiple compute nodes may be appreciated.

In one example, if system 100 provides a service to compute the average age of students in a college, two numbers may need to be computed, the sum of ages of all the students and the number of the students in the school. If there are too many students in the school for a single compute node to handle processing the entire task, driver compute node 106 may split the student information into five portions and distribute five tasks to five worker compute nodes 110. The task may ask worker compute nodes 110 to compute the sum of ages for the students in the corresponding portion. After worker compute nodes 110 receive the tasks, each worker compute node 110 may load the data that is required and compute the sum of ages in parallel. When the task is done, each worker compute node 110 may return the result, which may be the sum of ages for the portion of student information to driver compute node 106. After driver compute node 106 receives all the results from worker compute nodes 110, driver compute node 106 may calculate the sum of all five of the results to determine the final result of the sum of ages for all students. The number of students may also be calculated in a similar way in parallel.

Driver compute node 106 and worker compute nodes 110 may communicate through a network 104 that connects driver compute node 106 and worker compute nodes 110 together. In some embodiments, information transferred on network 104 is serialized first, and then transferred over network 104. The serialization of information may convert the data into bytes (e.g., a series of "1" or "0" values) of a bitstream. When the serialized data in the bitstream is received, a worker compute node 110 may de-serialize the bitstream. This converts the bitstream back to the original information. In some examples, serialization is a mechanism of converting the state of a data structure or object state into a format that can be stored or transmitted (e.g., a bitstream). Deserialization is the reverse process where the bitstream is used to recreate the actual object with the state. The mechanism is used to persist the object, as well as to send the object across a network. The serialization and deserialization of data will be discussed in more detail below.

Driver compute node 106 may execute an application that may use dependency injection. As mentioned above, a DI container may manage the dependencies between objects in the application. Driver compute node 106 is the entry point and leader of the system. Conventionally, dependency injection is applied at only driver compute node 106. The DI container of driver compute node 106 was conventionally used to generate objects and the dependencies for the objects in the application. Then, the objects and dependencies were serialized and transferred across network 104. However, as discussed in the Background, the serialization of the objects and dependencies may be problematic. For example, the objects of some adapter interface implementations need to be transferred to the worker data compute nodes 110 and the implementation of the adapter interfaces may not be serializable and need to be changed. The dependencies also have dependencies, and all the dependencies need to be serializable. This may require manual work to change the software code of the application. In some cases, the objects may include some information that cannot be serialized, such as objects that are bonded to specific system resources, such as network connections, database connections, etc. A database connection is a network connection to a database server and other related resources, such as network handler in the operating system, memory buffer, etc. The network or database connection for a specific system may not work for another system and should not be serialized for another system. Also, some classes, such as classes in third party libraries, cannot be modified to be serializable and thus cannot be transferred. In this case, manual intervention at each worker data compute node 110 to create the object is needed.

Accordingly, a DI transfer engine 108-1 in driver compute node 106 and DI transfer engines 108-2 to 108-N in worker compute nodes 110-1 to 110-N are used to transfer the DI container from driver compute node 106 to worker compute nodes 110-1 to 110-N. Then, when objects and their dependencies are created on driver compute node 106 and requested to be created on worker compute nodes 110-1 to 110-N, the object creation method may be serialized and transferred between driver compute node 106 and worker compute nodes 110 by DI transfer engines 108. Each worker compute node 110 may use its instantiated DI container to create the objects and dependencies for the application on its computing system 102. The serialization of the object creation method may be more efficient than serializing the object and its dependencies. This also does not require all aspects of the objects and its dependencies to be serializable. Rather, only the object creation method needs to be serializable and the serialization of the object creation method can be performed automatically.

The following will now describe the transfer process in more detail.

DI Container

Figure 2:
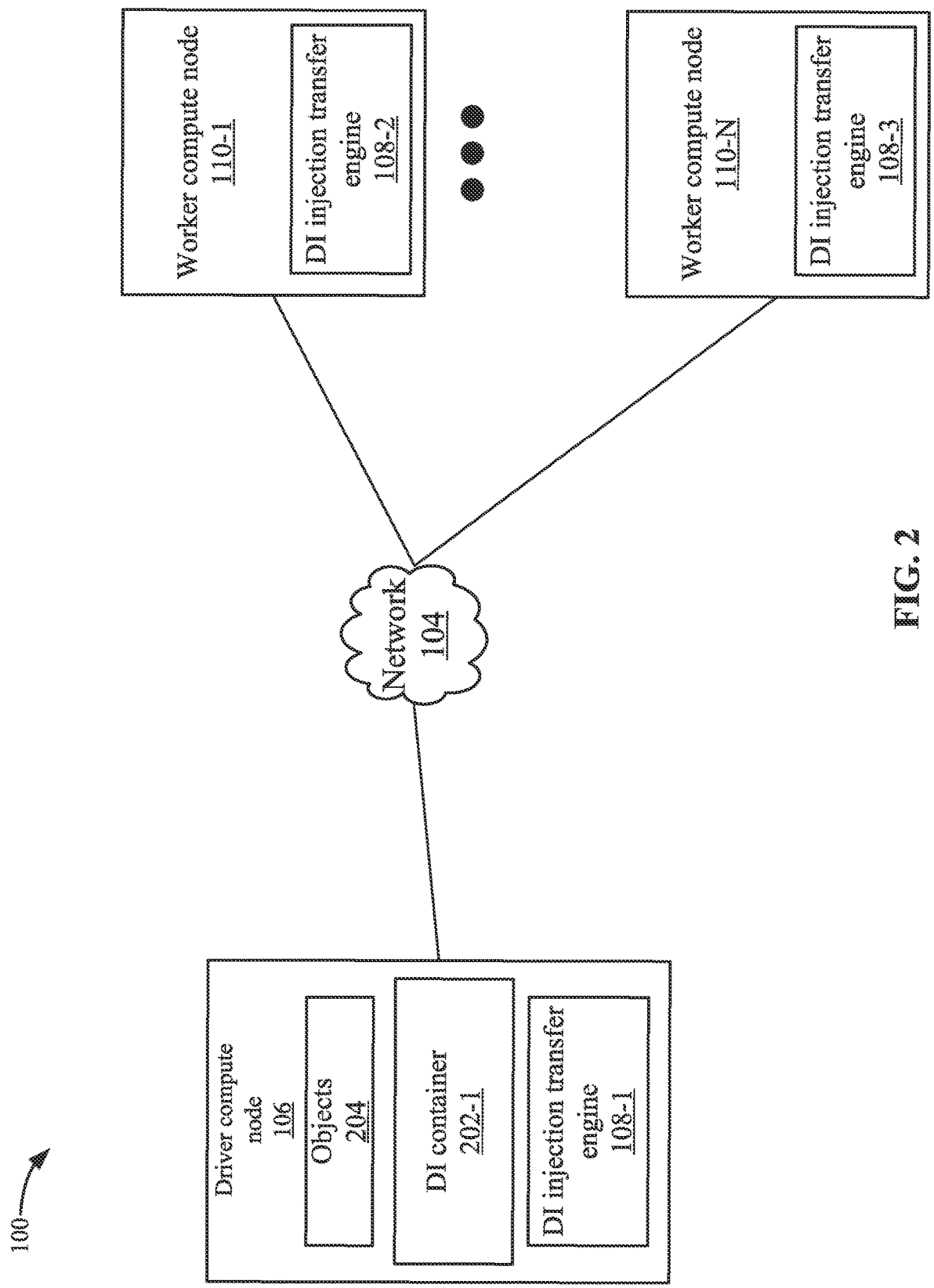
FIG. 2 depicts an example of the system before the transfer of a DI container according to some embodiments.

FIG. 2 depicts an example of system 100 before the transfer of a DI container 202-1 according to some embodiments. Driver compute node 106 may include a DI container 202-1 and objects 204. There may be dependencies between objects 204, which will be described below. Objects 204 may be instantiated on driver compute node 106.

An application that is run on driver compute node 106 may be based on types, which may include classes and interfaces. The classes may be a concept and instances of the classes may be referred to as objects 204. For example, classes may have multiple objects 204 that are instantiated on driver compute node 106. A class may include two parts. For example, the class may include the operations (or methods or procedures) that define instructions that a compute node can execute. In one example, the operation may be an operation of "ShowFuelAmount", which calculates a fuel amount for a car. The output is a fuel amount in liters. The class also includes a properties definition. For example, a car class may have properties such as color and size. The class definition defines the property type, but does not contain the actual value. The actual values of the properties may be contained in the class instance, that is, the instantiated object 204. Because the objects are instances of the corresponding classes that may contain the actual property values, objects 204 may only exist at the runtime of the application. Class definitions are compiled into a format, such as a binary format, for runtime. When driver compute node 106 runs and loads the compiled binary classes of the application, driver compute node 106 creates the objects using the definitions in the class and the corresponding values. The property values may be obtained from other data sources or other objects. Accordingly, an object may be an instance of a class.

Objects may depend on each other when a complex service is performed by the application. For example, a car may depend on a ranging detector to calculate the distance to other cars or obstacles. There may be two classes in this case, the car class and the ranging detector class. The car class depends on the ranging detector class. However, there may be various ranging detectors, such as a pulse radar ranging detector or a laser ranging detector. If the car is able to switch to a different type of radar in the future, then the car class should not depend on the actual implementation of the detector, such as an implementation of a laser source in the laser ranging detector. Rather, the application may define the common or shared operations between the car and all ranging detectors. These common operations may be defined as an interface. An interface of various ranging detectors for a car may be defined with common operations for the ranging detector, such as an operation of GetDistance with an input of direction and an output of distance in meters. This interface only defines common operations/methods and does not contain any properties. That is, the ranging detector may receive the direction as input and calculate a distance in meters in different ways. However, this implementation is not implemented in the car. The car only depends on the interface of the ranging detector and the different types of detectors have the same operation/methods definition as the interface. However, the different detectors may have different implementations for these common operations/methods. The different implementations may share the same operations/method name, input, and output, but may perform the operation differently to generate the output. Accordingly, the car can switch to any type of ranging detector when programmed using the interface. That is, the interface may abstract how the distance is detected in the actual detector, and the car may depend on the abstraction instead of the actual implementation, but could depend on the actual implementation in some cases. In another example, a computer may need a display monitor to display information and has a display interface, such as a high definition multimedia interface (HDMI). Any display device that implements the HDMI interface can be connected to the computer. The computer may be the class that depends on the HDMI interface, and the interface is implemented by the display monitor.

A dependency between the car and the ranging detector needs to be defined to allow the car to perform the functionality required of the ranging detector. A dependency graph may be used to define the dependencies. In an application, there may be many classes that depend on interfaces to other classes. The relationships of the dependencies may form the dependency graph. Dependency injection may be used to manage the dependency relationships between classes/objects. A dependency injection framework may connect all the classes/objects together to form a complete service for the application. When using dependency injection, a class, such as the car, depends on an interface, such as a ranging detector interface, instead of the concrete implementation. The car class can declare the interface of the ranging detector in its dependencies. The interface implementations for the ranging detectors, such as the laser ranging detector, may also be included in the system. However, the car and the laser ranging detector are not connected together until dependency injection is performed. DI container 202 may be a software library that provides dependency injection functionality at runtime.

DI container 202 may generate a dependency graph is in different ways. For example, DI container 202 may perform auto-wiring, which is the ability to automatically generate a dependency graph that maps between classes and interfaces metadata to inject dependencies into objects without the need to specify each dependency manually. Also, the dependency graph may be generated using input from a user, which may specify a dependency. To generate the dependency graph, DI container 202 may map between abstractions and concrete implementations. DI container 202 may inject the concrete instances into an object and manage the lifetime of the dependency. For example, DI container 202 may determine when to dispose of the object when its lifetime ends. Also, if an object requests the ranging detector for a second time, DI container 202 may or may not re-use the previous one according to the lifetime of the object, which may also be the object's scope. Accordingly, DI container 202 may know all of the dependency relationships in the dependency graph and be able to connect all the classes/objects together. Each class may declare the dependency interfaces and does not care about the actual instances, which decouples classes from each other.

Figure 3:
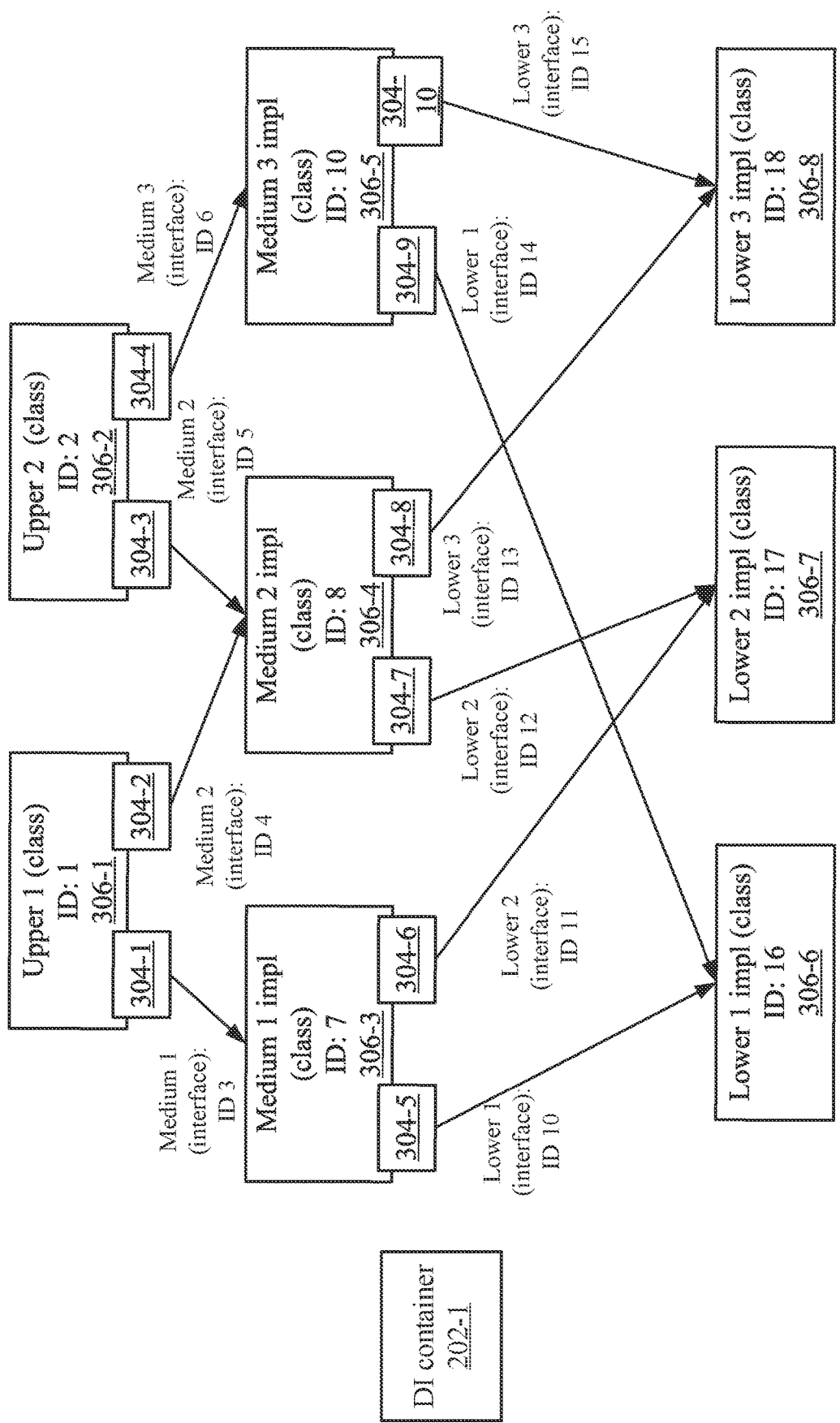
FIG. 3 depicts an example of a dependency graph that is maintained by the DI container according to some embodiments.

FIG. 3 depicts an example of a dependency graph that is maintained by DI container 202-1 according to some embodiments. There may be three layers of nodes in the dependency graph that represent classes 306 for the application. For example, a first layer may be an upper class layer that includes classes 306-1 and 306-2. The identifiers for the classes may be upper 1 (class) and upper 2 (class). The name of the class is "upper 1" or "upper 2") and "(class)" represents it is a class. A second layer may include a medium layer that may include classes 306-3, 306-4, and 306-5. The identifiers for the classes may be medium 1 implementation (impl) (class), medium 2 impl (class), and medium 3 impl (class). The term "implementation" may represent this is a class that implements the interface of an identifier, such as "medium 1", "medium 2", and "medium 3". A lower layer may include classes 306-6, 306-7, and 306-8. The identifiers for the classes may be lower 1 impl (class), lower 2 impl (class), and lower 3 impl (class). It will be noted that although this dependency graph is described, different relationships between classes and interfaces may be appreciated.

In the above, classes 306 may include interfaces 304 that refer to other classes 306. For example, upper 1 (class) 306-1 depends on medium 1 (interface) 304-1 and medium 2 (interface) 304-2. The identifier for the interfaces is "medium 1" or "medium 2" and "(interface)" indicates this is an interface. Medium 1 (interface) 304-1 is implemented by medium 1 implimol-(class) 306-3 and medium 2 (interface) 304-2 is implemented by medium 2 implimol-(class) 306-4. Similarly, upper 2 (class) 306-2 depends on medium 2 (interface) 304-3, which is implemented by medium 2 impl (class) 306-4, and medium 3 (interface) 304-4, which is implemented by medium 3 impl (class) 306-5. Medium 1 impl (class) 306-3, medium 2 impl (class) 306-4, and medium 3 impl (class) 306-5 also depend on interfaces 304-5 to 304-10, which are implemented by lower classes 306-6 to 306-8. For example, medium 1 impl (class) 306-3 depends on lower 1 (interface) 304-5 and lower 2 (interface) 304-6. Lower 1 (interface) 304-5 is implemented by lower 1 impl (class) 306-6 and lower 2 (interface) 304-6 is implemented by lower 2 impl (class) 306-7. Similarly, medium 2 impl (class) 306-4 depends on lower 2 (interface) 304-7 and lower 3 (interface) 304-8. Lower 3 (interface) 304-8 is implemented by lower 3 impl (class) 306-8. Also, medium 3 impl (class) 306-5 depends on lower 1 (interface) 304-5 and lower 3 (interface) 304-10. Lower 3 (interface) 304-10 is implemented by lower 3 impl (class) 306-8.

Figure 4A:
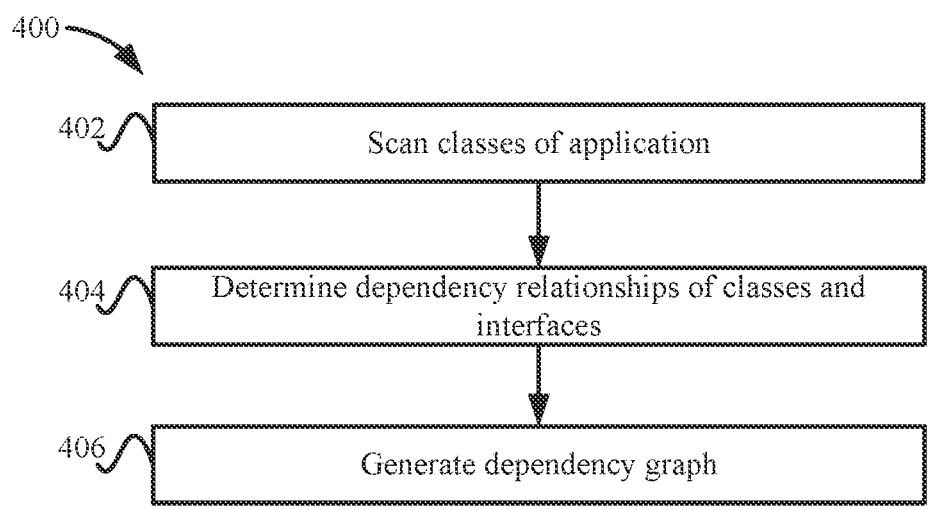
FIG. 4A depicts a simplified flowchart of a method for generating a dependency graph according to some embodiments.

DI container 202 may scan the classes when an application starts up at runtime and determine the dependency relationships of the classes and interfaces to create the dependency graph. FIG. 4A depicts a simplified flowchart 400 of a method for generating a dependency graph according to some embodiments. At 402, DI container 202 scans classes of an application or runs some predefined logic to determine the dependency relationship. The classes may include the upper classes, medium classes, and lower classes, but different structures or portions of classes may be scanned depending on the application.

At 404, DI container 202 determines dependency relationships of the classes and respective interfaces. For example, a class may refer to an interface, such as upper 1 (class) may refer to the medium 1 (interface) and the medium 2 (interface). At 406, DI container 202 generates a dependency graph using the above information. For example, DI container 202 may generate the dependency graph by scanning compiled binary classes to determine dependencies from a class definition. Class definitions may include dependencies on interfaces or other classes, and the interfaces may be implemented by classes found in other sections of the software code. The scanning of the software code may determine a class that implements the interface. Also, logic to define dependencies may be received, such as when two implementations of an interface are included in the class definitions, and one of them should be selected.

Then, DI container 202 or another module may assign unique identifiers to nodes of the graph to allow for the serialization of the object creation method as will be described below. Each identified node may be associated with a class, interface, and/or predefined rule. The predefined rules may include information on how to create an object 204, where to read a property value (e.g., from a file path for a configuration file). For example, for a database object, the name or path of the configuration file may store a connection string, username, password, and the predefined rules define how to read information from the configuration file to create the database connection.

The identifiers are assigned to allow driver compute node 106 to communicate a node in the dependency graph to a worker compute node 110-2 that maintains the dependency graph. Not all nodes may be assigned identifiers, such as nodes that correspond to objects that may not be transferred to worker compute nodes 110 may not be assigned identifiers. The identifiers may be related to the position on the dependency graph and not the content of a class or interface associated with the node. The identifiers may be determined from the classes and interfaces that are defined in the application. For example, the identifiers are from 1 to 18 for the classes and interface defined in the application. A node for upper 1 (class) 306-1 may have an identifier of ID 1, and may depend on the medium 1 (interface) of ID 3 and the medium 1 (interface) of ID 4. The node for medium 1 (interface) of ID 3 may be connected to a node for the class medium 1 impl 306-3 with an identifier of ID 7 that implements the medium 1 (interface) and the node for medium 1 (interface) of ID 4 may be connected to a node for the class medium 1 impl 306-4 with an identifier of ID 8 that implements the medium 2 (interface), and so on. The identifier may be any information that may uniquely identify a node in the dependency graph. For example, any identifier that can uniquely distinguish nodes in the dependency graph may be used. The identifiers should be serializable because they may be transferred between compute nodes. In some embodiments, each object 204 may be assigned an object identifier, which may refer to the node identifier in the dependency graph. When the object should be created, the node identifier may be serialized and sent to the worker to create the object 204 on the worker (with the dependencies) as the object creation method. It is noted the node identifier is different from the class identifier for the class, such as upper 1 (class) and medium 1 impl (class), which identify the respective classes. Although the node identifier is described as an integer, other names may be used.

Figure 4B:
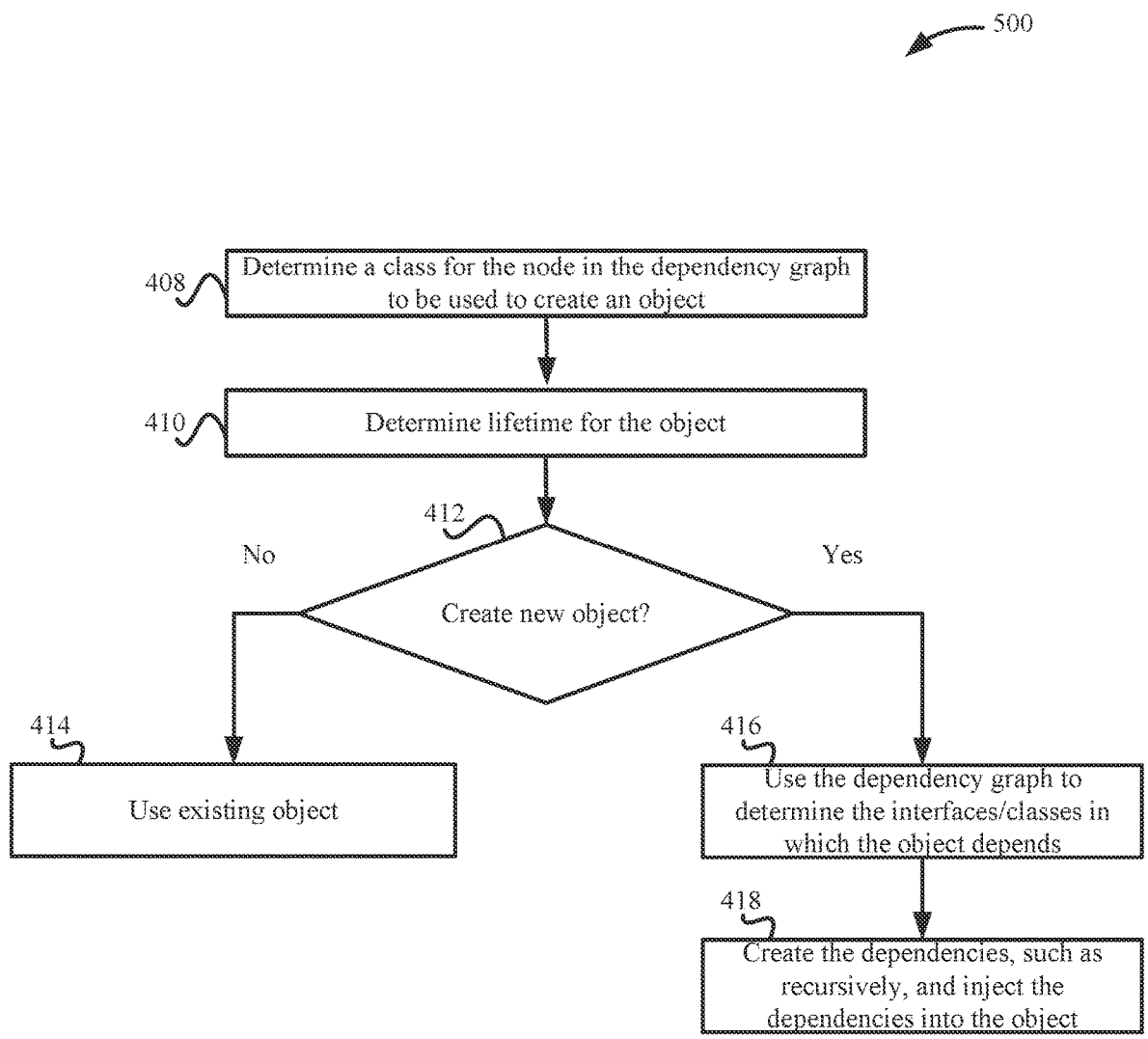
FIG. 4B depicts a simplified flowchart of a method for creating objects according to some embodiments.

DI container 202 may create objects 204 that are required for the application using the dependency graph. For example, at runtime, DI container 202 uses the dependency graph to determine dependencies for objects in the application. FIG. 4B depicts a simplified flowchart of a method for creating objects 204 according to some embodiments. At 408, DI container determines a class for the node in the dependency graph to be used to create an object. For example, an object 204 of upper 1 (class) 306-1 is created in driver compute node 106 to perform a service.

At 410, DI container 202 determines the lifetime for the object 204. The lifetime of an object may be determined differently, such as by a default lifetime setting or be specified for a class in DI container 202. The lifetime can define whether to re-use previously existing objects 204 when a request to create the object 204 is received again. One lifetime may be referred to as "singleton", which indicates that an object 204 is only created once. That is, every time the object of upper 1 (class) 306-1 is requested, the same object 204 will be returned, and a new object 204 is not created. On the contrary, if the lifetime is indicated as "transient", a new object 204 of that class may be created every time it is requested by another object 204. Other types of lifetime configurations may be used. At 412, DI container 410 uses the lifetime to determine whether a new object 204 needs to be created. If an object 204 has already been created and the lifetime of the object 204 is singleton, then DI container 202 does not need to create another object 204. Thus, at 414, DI container 202 uses an existing object 204.

If a new object 204 should be created, at 416, DI container 202 may use the dependency graph to determine the interfaces/classes on which the object 204 depends. When a dependency is encountered, DI container 202-1 may determine the implementation of the corresponding interface 304. For example, when creating an object 204 for the upper 1 (class) 306-1, DI container 202 may use the information from upper 1 (class) 306-1 for interfaces 304-1 and 304-2 to determine the implementations for the interfaces, which are implemented by medium 1 impl (class) 306-3 and medium 2 impl (class) 306-4, respectively. These are direct dependencies as they are defined for the respective upper 1 (class) 306-1. The medium 1 impl (class) 306-3 and the medium 2 impl (class) 306-4 also have dependencies of lower 1 (interface) 304-5 to the implementation of the interface at lower 1 impl (class) 306-6, lower 2 (interface) 304-6 to the implementation of the interface at lower 2 impl (class) 306-7, lower 2 (interface) 304-7 to the implementation of the interface at lower 2 impl (class) 306-7, and lower 3 (interface) 304-8 to the implementation of the interface at lower 3 impl (class) 306-8. These are indirect dependencies that are defined in classes other than the class that is used to create the object 204 of upper 1 (class) 306-1. Accordingly, upper 1 (class) 306-1 depends on the medium 1 (interface) 304-1 and medium 2 (interface) 304-2, but not the classes that implement the interface, which are medium 1 impl (class) 306-3 and medium 2 impl (class) 306-4. During runtime, the object 204 of upper 1 (class) 306-1 depends on the objects 204 of medium 1 impl (class) 306-3 and medium 2 impl (class) 306-4 based on the injection from DI container 202.

Figure 4C:
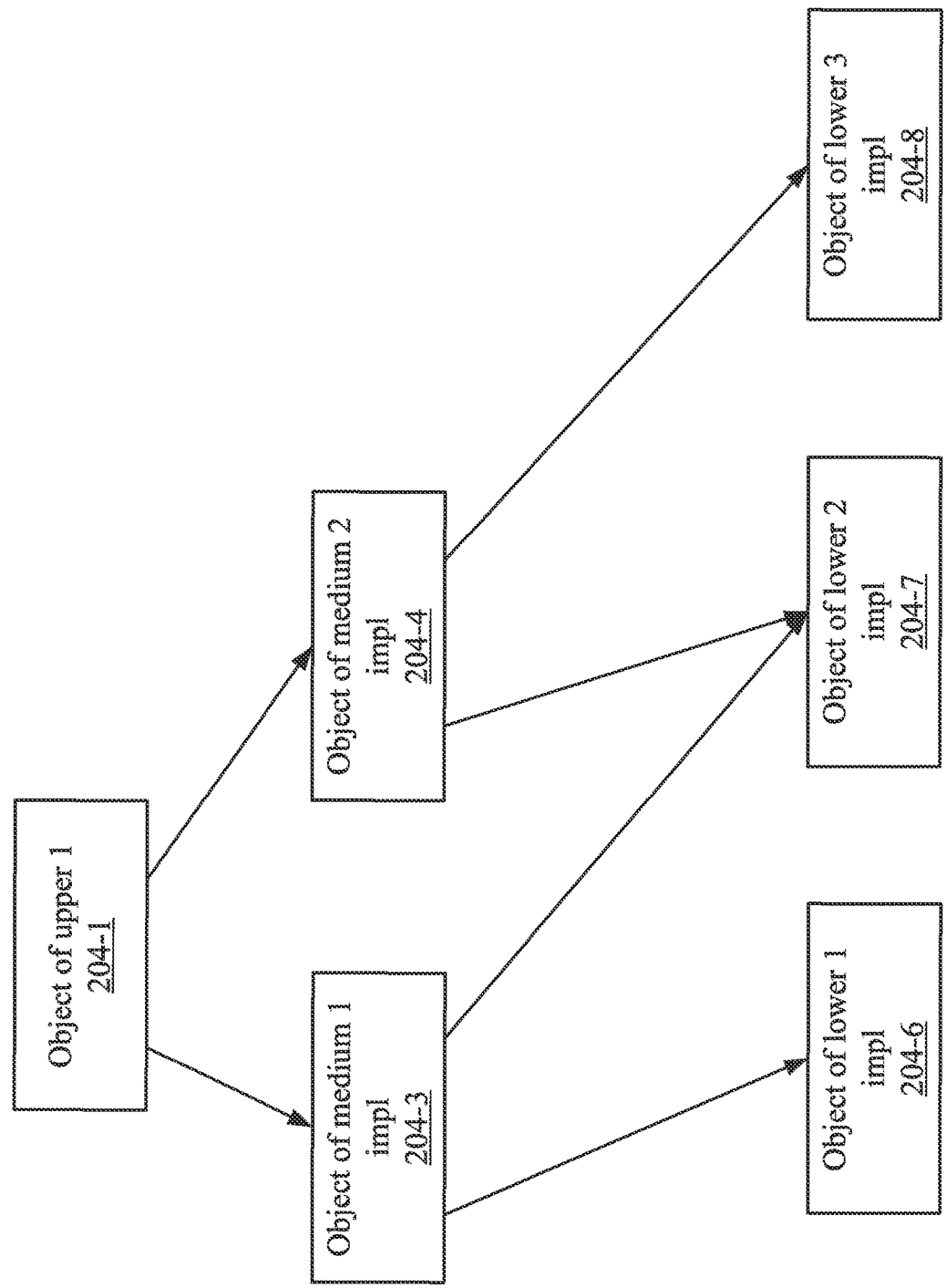
FIG. 4C depicts an example of the created objects according to some embodiments.

At 418, DI container 202 may create the dependencies, such as recursively, and inject the dependencies into object 204. Because there are multiple levels of dependencies, DI container 202 may start on the lowest level and recursively perform the injection. FIG. 4C depicts an example of the created objects 204 according to some embodiments. For example, DI container 202 may create lower objects, such as an object 204-6 for lower 1 impl (class) 306-6, an object 204-7 for lower 2 impl (class) 306-7, and an object 204-8 for lower 3 impl (class) 306-8, and then medium objects, such as an object 204-3 for medium 1 impl (class) 306-3 and an object 204-4 for medium 2 impl (class) 306-4, and finally an object 204-1 for upper 1 (class) 306-1. Within each object 204, DI container 202 may inject the implementations of interfaces 304 into a respective object. For example, object 204-6 and object 204-7 are injected into object 204-3. Also, object 204-7 and object 204-8 are injected into object 204-4. Then, object 204-3 and object 204-4 are injected into object 204-1 for upper 1 (class) 306-1. An object 204 may be injected into another object in different ways. For example, an object 204 may refer to the identifier for the interface. Here, medium 1 (interface) 304-1 of ID 3 may refer to the object 204-3 with an ID of 7 for medium 1 impl (class) 306-3. Also, the medium 2 (interface) 304-2 with an ID of 4 may refer to the ID of 8 for the object 204-4 for medium 2 impl (class) 306-4. Also, an object 204 may depend on the implementation (e.g., identifier) for the interface. Here, the object 204-3 with an ID of 7 for medium 1 impl (class) 306-3 and the object 204-4 with an ID of 8 for medium 2 impl (class) 306-4 are received by object 204-1 for upper 1 (class) 306-1. If object 204-1 is created and the class has a dependency on object 204-3, the dependency may be represented as a property in object 204-1. DI container 202 may assign object 204-3 to object 204-1 as a dependency, such as a property holding the reference to object 204-3.

Multiple Data Compute Node System

Driver compute node 106 may be the entry point and leader of the system. Typically, DI container 202-1 was only applied to the driver compute node 106. DI container 202 creates the objects 204 and dependencies on driver compute node 106. When an application is complex, there may be many objects/classes that have dependencies on other instances, with those instances having other dependencies on other instances. Conventionally, all of the objects 204 and dependencies need to be serialized and transferred across network 104, which is a lot of data to be transferred across network 104. If the above objects 204 are serialized, information needed to recreate objects 204 is converted to bytes of a bitstream. For example, the class identity of each object 204 and information for objects 204, such as the property values of each object 204 and the dependencies, may be converted to bytes of a bitstream. Objects 204 hold the references of the dependent objects (e.g., dependencies) in properties, which are serialized. Conventionally, to serialize the object, the referenced objects (e.g., dependencies) will also be serialized. Otherwise, the referenced objects will not be available after deserialization of the bitstream, and the object will not work. This creates a large amount of data that is serialized. The bytes of the bitstream may then be transmitted across network 104 to another data compute node, such as worker compute nodes 110. A worker compute node 110 may de-serialize the bytes of the bitstream and create the object 204 with the same class identity, property values, and dependencies. Also, the referenced objects 204 are also deserialized and created.

Figure 5:
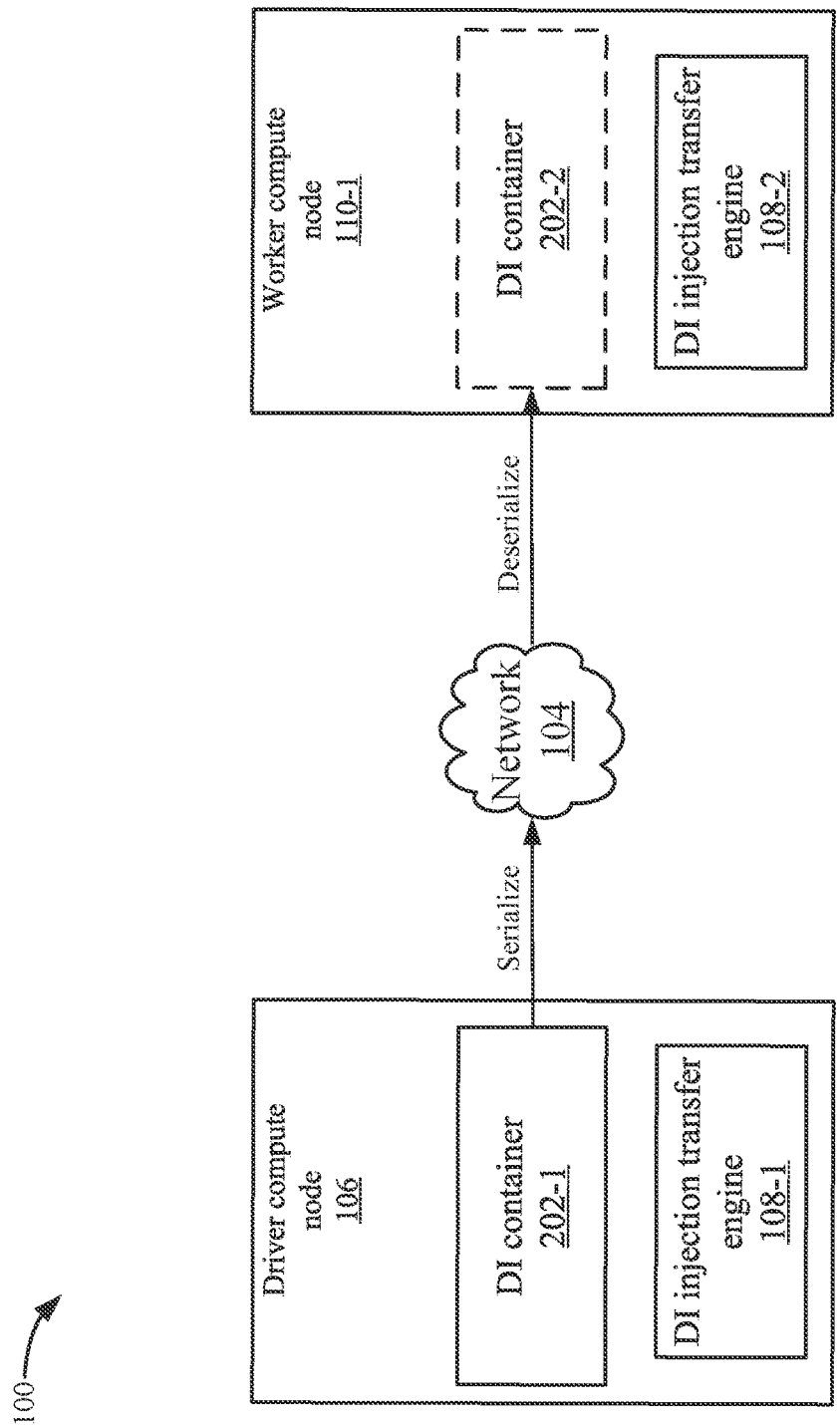
FIG. 5 depicts an example of transferring a DI container in the system according to some embodiments.

In contrast to the above conventional method of serializing objects, driver compute node 106 transfers information for DI container 202-1 to worker compute nodes 110, and then transfers an object creation method of objects 204 in contrast to serializing the properties of the objects and the referenced objects. The transfer of DI container 202 will be discussed first and then the transfer of the object creation method. FIG. 5 depicts an example of transferring a DI container 202 in system 100 according to some embodiments. DI container 202 may be transferred once and used throughout the process of using the application. The system creates DI containers 202 on each worker compute node 110. Worker compute node 110 may have the same format of the classes defined in its computing system 110 to be able to create the objects 204 from the classes at runtime. A DI container 202-1 on driver compute node 106 may include the dependency graph of objects 204 for the application that is described above. The dependency graph may define the identifiers for the nodes of the dependency graph that are used to track the nodes that are used to generate objects 204.

DI transfer engine 108-1 may serialize information for DI container 202-1. The information in the dependency graph may be serialized into binary information, which may be more efficient than serializing the property values of each of the objects. It is noted that the information may include the identifiers for objects 204 and interfaces 304, but there may be other related information that may need to be included for the dependency graph, which may also be serializable. The related information may include the dependency relationship between each node of the dependency graph (e.g., interface, class, or predefined rules). Then, DI transfer engine 108-1 transfers the serialized information across network 104 to worker compute node 110-1.

Once receiving the bitstream, DI transfer engine 108-2 then de-serializes the information and creates a DI container 202-2 on worker compute node 110-N. DI container 202-2 may include the information for the dependency graph in DI container 202-1, and any other related information that was serialized. The serialized information may include the identifiers for the nodes in the dependency graph described above with respect to FIG. 3, which is different from a class type identifier for a class (e.g., upper 1 (class)). The identifiers for the nodes may be based on the node's position in the dependency graph and the identifier for the class type may identifier the class and not the position in the dependency graph. The dependency graph provides DI container 202-2 with information needed to create objects 204 at worker compute node 110-1. It is noted that the above process may be performed between different compute nodes in the system, such as from driver compute node 106 to multiple worker compute nodes 110-N. Also, it is possible that worker compute nodes 110 may communicate between each other to transfer a DI container 202.

Figure 6:
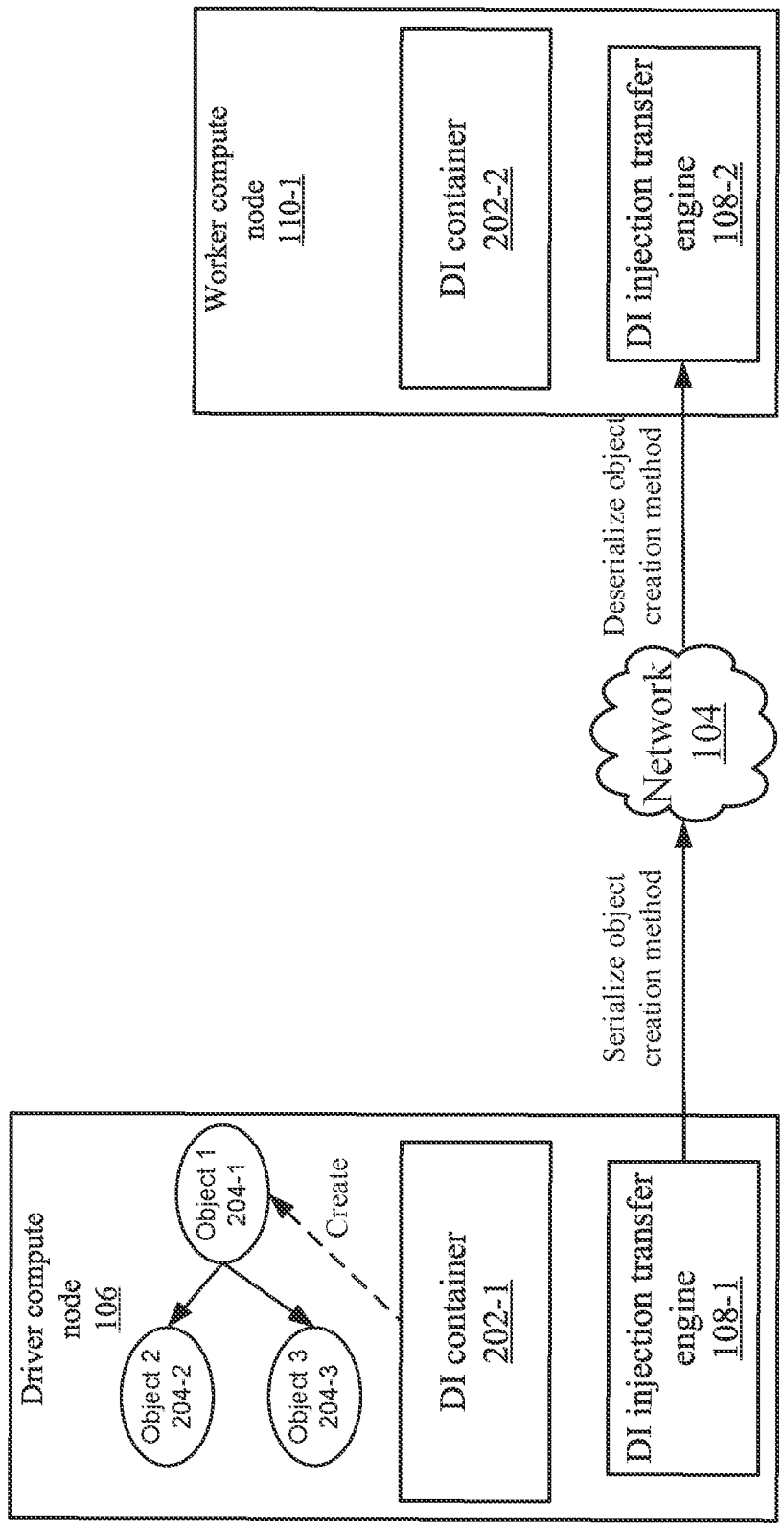
FIG. 6 depicts an example of transferring an object creation method according to some embodiments.

After transferring DI container 202, object creation methods may be transferred to have objects 204 and dependencies created on worker compute nodes 110. FIG. 6 depicts an example of transferring an object creation method according to some embodiments. First, DI container 202-1 may create objects 204 for an application at runtime on driver compute node 106. For example, DI container 202-1 may create object 1 204-1, object 2 204-2, and object 3 204-3. Object 1 204-1 may also have dependencies on object 2 204-2 and object 3 204-3. It is noted that DI container 202-1 may create many more objects and dependencies for an application. The creation of the objects 204 may be performed using the class definitions of objects 204 and interfaces 304. For example, each object 1 204-1 may have assigned property values in the object 204. Also, any dependencies passed to an object 204, which may be held as references to the dependent objects 204 as property values that are injected into an object 204.

Figure 7:
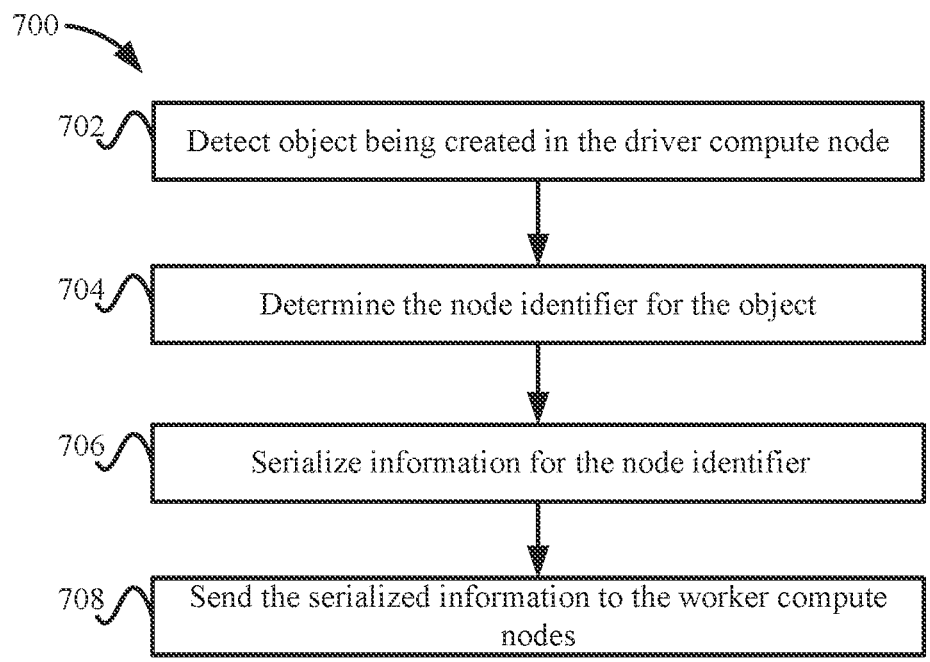
FIG. 7 depicts a simplified flowchart of a method for transferring the creation of objects according to some embodiments.

Instead of serializing the property values for the objects 204 themselves and the dependencies, DI transfer engine 108-1 may serialize the object creation method. For example, referring to FIG. 3, the object creation method may determine which classes 306 or implementations of interfaces 304 to create. FIG. 7 depicts a simplified flowchart 700 of a method for transferring the creation of objects 204 according to some embodiments. At 702, driver compute node 106 detects the creation of an object. In some embodiments, driver compute node 106 wants to create object 204-1 of upper 1 (class) 306-1. At 704, driver compute node 106 determines the node identifier for the object. For example, the identifier of "1" is for object 204-1 of upper 1 (class) 306-1. Then, at 706, driver compute node 106 serializes information for the node identifier. DI transfer engine 108-1 may serialize the node identifier of "1" for object 204-1 of upper 1 (class) 306-1. At 708, driver compute node 106 sends the serialized information to worker compute nodes 110 through network 104 to DI transfer engine 108-2. Then, after de-serializing the bitstream, DI transfer engine 108-2 can determine that an object 204-1 of upper 1 (class) 306-1 needs to be created in worker compute node 110-1. Unlike the conventional method, the objects that are depended on by object 204-1 of upper 1 (class) 306-1 do not need to be serialized. Also, the identifiers for the dependent objects may not be serialized as the dependency graph on worker compute node 110 is used to determine the dependencies.

Figure 9:
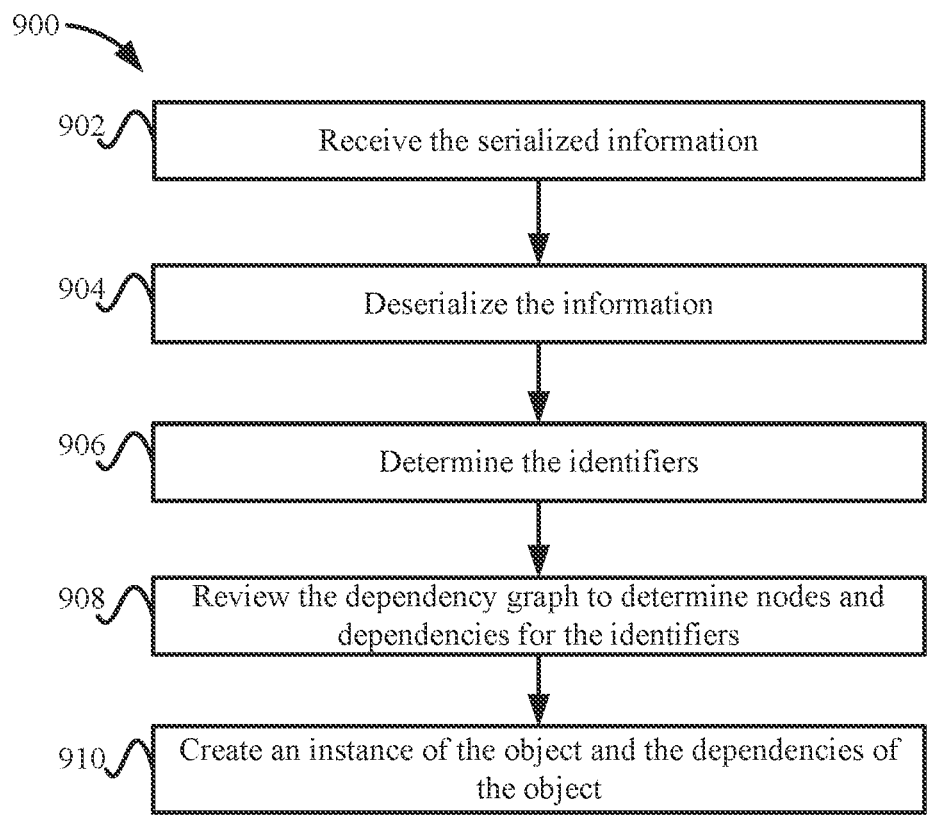
FIG. 9 depicts a simplified flowchart of a method for processing the serialized information at a worker compute node according to some embodiments.

FIG. 8 depicts an example of the creation of objects 204 on worker compute node 110-1 according to some embodiments. Once receiving the serialized information, DI container 202-2 de-serializes the information and re-creates the objects 204 on worker compute node 110. FIG. 9 depicts a simplified flowchart 900 of a method for processing the serialized information at a worker compute node 110 according to some embodiments. This process may be performed at each worker compute node 110. At 902, worker compute node 110 receives the serialized information. Then, at 904, worker compute node 110 de-serializes the information.

At 906, worker compute node 110 determines the identifiers in the serialized information. For example, worker compute node 110 may deserialize and determine the identifier of "1". At 908, worker compute node 110 reviews the dependency graph to locate a node of the dependency graph (e.g., the class, interface, and predefined rule) for the identifier and dependencies for the identifier on the dependency graph. The dependency graph is used to identify the node that corresponds to the object 204. Also, the dependency graph is used to locate all nodes that the identified node depends on (including both direct and indirect dependencies). Each identified node may be associated with a class, interface, and/or predefined rule. At 910, worker compute node 110 creates an instance of object 204-1 of upper 1 (class) 306-1 and the dependencies for the object. The creation may be performed in different ways. In some embodiments, objects 204 at the lowest level of dependencies may be created first, such as the object 204-6 of lower 1 impl (class) 306-6, the object 204-7 of lower 2 impl (class) 306-7, and the object 204-8 of lower 3 impl (class) 306-8. Then, the object 204-3 of medium 1 impl (class) 306-3 and the object 204-4 of medium 2 impl (class) 306-4 are created. Then, object 204-1 of upper 1 (class) 306-1 is created. The dependencies of the objects may be injected into objects 204 based on the class definition for the objects. DI container 202-2 creates the objects 204 based on the information found in the dependency graph and generates the properties based on the class definition or predefined rules.

In some embodiments, the state of objects 204 may be made immutable. This is because the object 204 that is recreated using the identifier may use the state that is found on worker compute node 110 and not driver compute node 106. If the state of the object 204 on driver compute node 106 has been changed, but is not seen in worker compute node 110, the state of the object 204 created in worker compute node 110 may not be the same as the state on driver compute node 106. However, it is possible that when a property value is changed on driver compute node 106, the change in state may be serialized and sent to worker compute nodes 110.

DI containers 202 provide the ability to control the lifetime of the generated object 204. Conventionally, because DI containers 202 are not located on each compute node, the lifetime of objects generated on a worker compute node 110 cannot be controlled. However, in some embodiments, because DI containers 202 are instantiated on worker compute nodes 110, each DI container 202 can control the lifetime of objects 204 according to some embodiments. For example, the dependency graph may specify the lifetime of an object 204, such as object 204-1 of upper 1 (class) 306-1.

A DI container 202 may use the same lifetime information that is received with driver compute node 106 to control the object lifetime of objects 204 instantiated on each worker compute node 110. For example, if upper 1 (class) 306-1 in a dependency graph has a singleton lifetime, the object 204-1 of upper 1 (class) 306-1 may be created with a singleton lifetime on driver compute node 106 and worker compute nodes 110. If object 204-1 of upper 1 (class) 306-1 is transferred to worker compute node 110 multiple times, the first time, worker compute node 110 may create a new object 204-1 of upper 1 (class) 306-1. But, thereafter, such as for the second time the object is requested to be transferred to worker compute node 110, DI container 202-2 uses the dependency graph to determine that the lifetime of object 204-1 of upper 1 (class) 306-1 is singleton, and DI container 202 re-uses the existing object that was created the previous time.

Dependency Graph Example

FIG. 10 depicts an example of software code for an application according to some embodiments. As discussed above, the application may include a class of Upper1, which depends on two interfaces, medium 1 and medium 2. At 1002, the dependency graph in DI container 202 may include a class Upper1. The class Upper1 depends on interfaces medium1 and medium2. Both interfaces medium1 and medium2 may be declared as abstractions, and not concrete implementations (e.g., an object of the interface is not created; rather, an instance of the class that implements the interface is created). For example, at 1004, a Medium1 interface is declared and at 1006, a Medium2 interface is declared. There are also classes that implement the interfaces Medium1 and Medium2 in the code declared as Medium1Impl1 and Medium2Impl1 at 1008 and 1010, respectively. Both implementations also have dependencies shown at 1012 and 1014. For example, class Medium1Impl1 depends on interfaces Lower1 and Lower2 and class Medium2Impl1 depends on interfaces Lower2 and Lower3. The classes lower1Impl1, Lower2Impl1, and Lower3Impl1, which are classes that implement the interfaces, are also included in the code at 1016, 1018, and 1020, respectively.

When an application instantiates an object of Upper1, DI container 202 may automatically determine (or previously determined) the concrete types of the abstracted dependencies and inject them into the object of Upper1. In this example, DI container 202 injects the objects Lower1Impl1 and Lower2Impl1 into an object of Medium1Impl1 and injects the objects Lower2Impl1 and Lower3Impl1 into an object of Medium2Impl1. Then, DI container 202 injects the objects Medium1Impl1 and Medium2Impl2 into an object of Upper1. The runtime application is built based on these injections and the object of Upper1 is ready to be executed.

Ranking System

In some embodiments, a system may use a ranking system that may have a core algorithm that adjusts ranking strategy based on user feedback, such as click behavior or watch behavior. The adjustment interval may be very short, such as in minutes once receiving the user account feedback. There may be many different ranking strategies. A model trainer is responsible for training the ranking strategies. The adjustment may be performed based on user behavior and cannot be performed by a single worker compute node. Because of the large number of users and feedback data, all the information cannot be processed on a single compute node. Accordingly, dependency injection may be used to generate objects 204 to run in a driver compute node 106 and worker compute nodes 110. Each driver compute node 106 and worker compute nodes 110 may include the different rankers that are used. To generate objects 204 on driver compute node 106 and transfer those objects 204 to worker compute nodes 110, the above process of serializing the object 204 for each method may be used. This alleviates having to transfer the objects 204 that are used for the ranking strategies themselves and avoid the requirement of serializing dependencies that may not be serializable.

CONCLUSION

Accordingly, by creating DI containers 202 on a driver compute node 106 and worker compute nodes 110, the serialization and deserialization of information is simplified and more efficiently transferred across network 104. Also, any previously required development work to make objects 204 serializable is avoided. The development is also simplified because the classes/objects do not have to be serializable because the identifiers for nodes are serialized instead of the objects 204 themselves. This also helps when third party code may be used, which may not be modifiable to be serializable. Additionally, other features may be provided that were not previously possible, such as object lifetime management on worker compute nodes 110, because DI containers 202 are located on worker compute nodes 110 in comparison to just driver compute node 106 conventionally. Not only is the information that is transferred in system 100 simplified, the manual efforts to have objects 204 that are created be serializable is also avoided.

System

Figure 11:
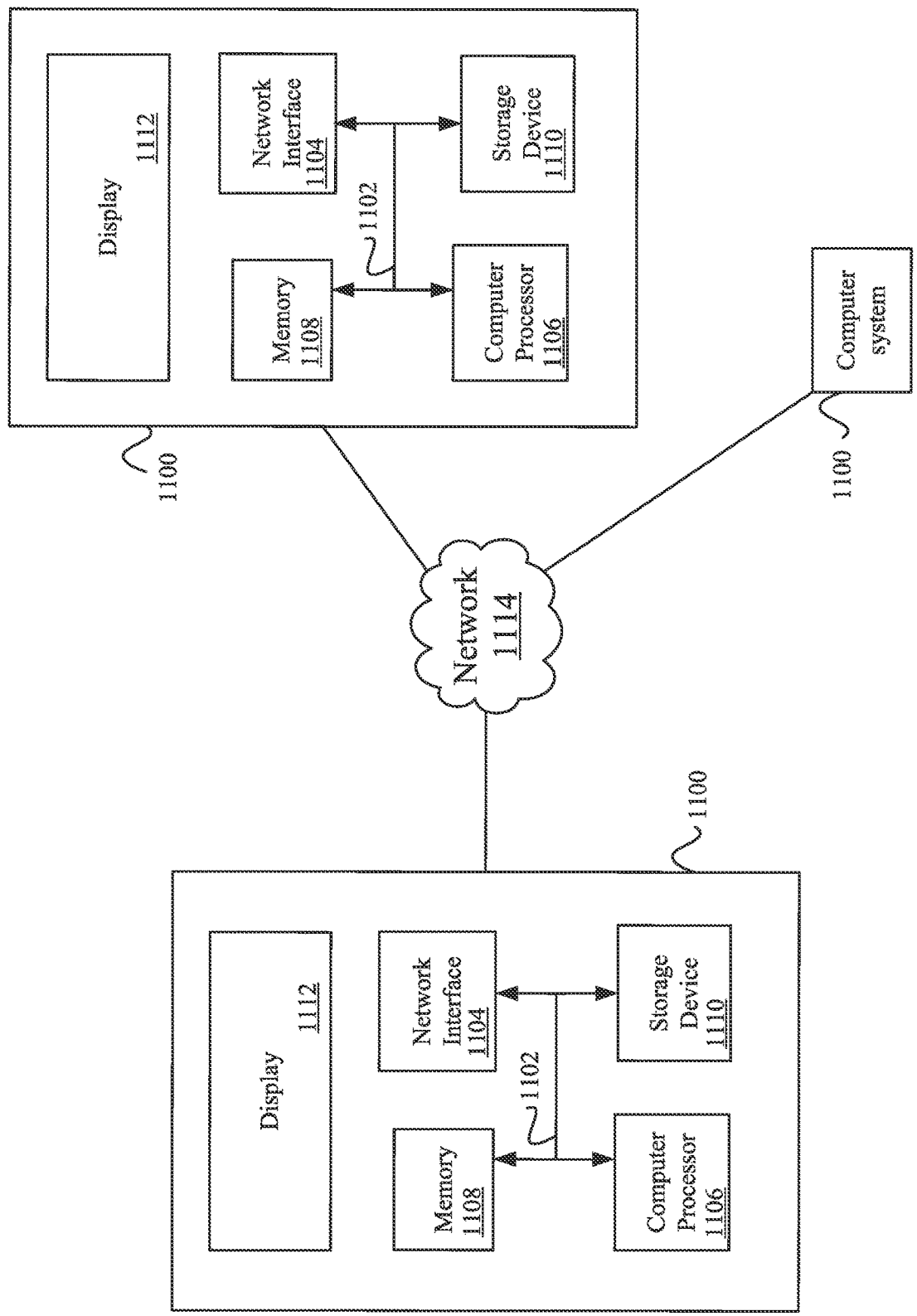
FIG. 11 illustrates an example of special purpose computer systems according to one embodiment.

FIG. 11 illustrates an example of special purpose computer systems X00 according to one embodiment. Computer system 1100 includes a bus 1102, network interface 1104, a computer processor 1106, a memory 1108, a storage device 1110, and a display 1112.

Bus 1102 may be a communication mechanism for communicating information. Computer processor 1106 may execute computer programs stored in memory 1108 or storage device 1110. Any suitable programming language can be used to implement the routines of some embodiments including C, C++, Java, assembly language, etc. Different programming techniques can be employed such as procedural or object oriented. The routines can execute on a single computer system 1100 or multiple computer systems 1100. Further, multiple computer processors 1106 may be used.

Memory 1108 may store instructions, such as source code or binary code, for performing the techniques described above. Memory 1108 may also be used for storing variables or other intermediate information during execution of instructions to be executed by processor 1106. Examples of memory 1108 include random access memory (RAM), read only memory (ROM), or both.

Storage device 1110 may also store instructions, such as source code or binary code, for performing the techniques described above. Storage device 1110 may additionally store data used and manipulated by computer processor 1106. For example, storage device 1110 may be a database that is accessed by computer system 1100. Other examples of storage device 1110 include random access memory (RAM), read only memory (ROM), a hard drive, a magnetic disk, an optical disk, a CD-ROM, a DVD, a flash memory, a USB memory card, or any other medium from which a computer can read.

Memory 1108 or storage device 1110 may be an example of a non-transitory computer-readable storage medium for use by or in connection with computer system 1100. The non-transitory computer-readable storage medium contains instructions for controlling a computer system 1100 to be configured to perform functions described by some embodiments. The instructions, when executed by one or more computer processors 1106, may be configured to perform that which is described in some embodiments.

Computer system 1100 includes a display 1112 for displaying information to a computer user. Display 1112 may display a user interface used by a user to interact with computer system 1100.

Computer system 1100 also includes a network interface 1104 to provide data communication connection over a network, such as a local area network (LAN) or wide area network (WAN). Wireless networks may also be used. In any such implementation, network interface 1104 sends and receives electrical, electromagnetic, or optical signals that carry digital data streams representing various types of information.

Computer system 1100 can send and receive information through network interface 1104 across a network 1114, which may be an Intranet or the Internet. Computer system 1100 may interact with other computer systems 1100 through network 1114. In some examples, client-server communications occur through network 1114. Also, implementations of some embodiments may be distributed across computer systems 1100 through network 1114.

EXAMPLE EMBODIMENTS

In some embodiments, a method for performing a service in a system including a plurality of compute nodes, the method comprising: installing, by a second compute node in the plurality of compute nodes, a dependency injection container to manage a dependency graph of dependencies for classes in an application, wherein the dependency injection container is determined from a first compute node in the plurality of compute nodes that manages performing the service with the plurality of compute nodes; receiving, by the second compute node, information identifying a node in the dependency graph from the first compute node, wherein the information is received to create a first object that has been created on the first compute node; using, by the second compute node, the information to determine a first class for the node in the dependency graph and a dependency on a second class; and creating, by the second compute node, the first object of the first class with the dependency on a second object of the second class on the second compute node.

In some embodiments, receiving the information identifying the node comprises: receiving a serialized bitstream for the information identifying the node; and deserializing the serialized bitstream to determine information for the node.

In some embodiments, the first compute node is a driver compute node in the plurality of compute nodes and the second compute node is a worker compute node in the plurality of compute nodes; and the driver compute node sends tasks for portions of the service to the worker compute nodes.

In some embodiments, the method further comprising: receiving information for the dependency injection container from the first compute node, wherein the information allows the installing of the dependency injection container at the second compute node.

In some embodiments, receiving information for the dependency injection container comprises: receiving a serialized bitstream with the information for the dependency injection container; and de-serializing the serialized bitstream with the information for the dependency injection container.

In some embodiments, the method further comprising: assigning identifiers for nodes in the dependency graph to allow objects that are created on the first compute node to be identified for creation on the second compute node, wherein the identifiers for the nodes are received from the first compute node when respective objects are to be created on the second compute node.

In some embodiments, receiving the information identifying the node comprises: determining an identifier for the node for the first class in the dependency graph; and locating the node in the dependency graph based on the identifier.

In some embodiments, the method further comprising: using the dependency in the dependency graph to determine an interface to an implementation of the interface, wherein the implementation is the second class.

In some embodiments, creating the first object comprises: creating the first object in the second compute node at runtime of the application.

In some embodiments, creating the first object comprises: determining a property value for the first object; and creating the first object using the property value.

In some embodiments, creating the first object comprises: injecting the second object into the first object, wherein injecting allows the first object to use the second object.

In some embodiments, creating the first object comprises: injecting a third object into the second object, wherein injecting allows the first object to use the third object.

In some embodiments, injecting comprises: injecting the third object into the second object; and injecting the second object into the first object.

In some embodiments, the method further comprising: defining a lifetime for the first object, wherein the lifetime determines how to process another request to create the first object.

In some embodiments, the dependency graph is created based on scanning classes of the application and determining dependencies from one class to another class or interface that are commonly defined.

In some embodiments, the method further comprising: receiving a task from the first compute node; performing the task using the first object to determine an output; and providing the output to the first compute node.

In some embodiments, a non-transitory computer-readable storage medium containing instructions for performing a service in a system including a plurality of compute nodes, wherein the instructions, when executed, control a computer system to be operable for: installing, by a second compute node in the plurality of compute nodes, a dependency injection container to manage a dependency graph of dependencies for classes in an application, wherein the dependency injection container is determined from a first compute node in the plurality of compute nodes that manages performing the service with the plurality of compute nodes; receiving, by the second compute node, information identifying a node in the dependency graph from the first compute node, wherein the information is received to create a first object that has been created on the first compute node; using, by the second compute node, the information to determine a first class for the node in the dependency graph and a dependency on a second class; and creating, by the second compute node, the first object of the first class with the dependency on a second object of the second class on the second compute node.

In some embodiments, a method for performing a service in a system including a plurality of compute nodes, the method comprising: installing, by a first compute node in the plurality of compute nodes, a dependency injection container to manage a dependency graph of dependencies for classes in an application, wherein the first compute node in the plurality of compute nodes manages performing the service with the plurality of compute nodes; receiving, by the first compute node, an indication to create a first object; creating, by the first compute node, the first object of a first class using a dependency on a second object of a second class; and sending, by the first compute node, information identifying a node in the dependency graph to a second compute node in the plurality of compute nodes, wherein the second compute node has a dependency injection container from the first compute node installed, and uses the information to determine the first class for the node in the dependency graph from the dependency injection container and the dependency on the second class; and sending, by the first compute node, a task for the service to the second compute node, wherein the task is performed by the first object on the second compute node.

In some embodiments, the method further comprising: sending information for the dependency injection container from the first compute node to the second compute node, wherein the information allows the installing of the dependency injection container at the second compute node.

In some embodiments, sending the information identifying the node to the second compute node comprises: serializing the information indicating the node; and sending the serialized bitstream to the second compute node.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method for performing a service in a system including a plurality of compute nodes, the method comprising:
installing, by a second compute node in the plurality of compute nodes, a dependency injection container to manage a dependency graph of dependencies for classes in an application, wherein the dependency injection container is determined from a first compute node in the plurality of compute nodes that manages performing the service with the plurality of compute nodes;
receiving, by the second compute node, a serialized bitstream for information identifying a graph node of a plurality of graph nodes in the dependency graph from the first compute node, wherein the information is received to create a first object on the second compute node that has been created on the first compute node;
deserializing the serialized bitstream to determine the information identifying the graph node;
using, by the second compute node, the information to determine a first class in the classes for the graph node in the dependency graph and a dependency on a second class in the classes; and
creating, by the second compute node, the first object of the first class with the dependency on a second object of the second class on the second compute node.

2. The method of claim 1, wherein:
the first compute node is a driver compute node in the plurality of compute nodes and the second compute node is a worker compute node in the plurality of compute nodes; and
the driver compute node sends tasks for portions of the service to the worker compute node.

3. The method of claim 1, wherein the information identifying the graph node comprises first information, the method further comprising:
receiving second information for the dependency injection container from the first compute node, wherein the second information allows the installing of the dependency injection container at the second compute node.

4. The method of claim 3, wherein receiving the second information for the dependency injection container comprises:
receiving a serialized bitstream for the second information for the dependency injection container; and
de-serializing the serialized bitstream for the second information for the dependency injection container.

5. The method of claim 1, further comprising:
assigning identifiers for graph nodes in the dependency graph to allow objects that are created on the first compute node to be identified for creation on the second compute node, wherein the identifiers for the graph nodes are received from the first compute node when respective objects are to be created on the second compute node.

6. The method of claim 1, wherein receiving the serialized bitstream for the information identifying the graph node comprises:
determining an identifier for the graph node for the first class in the dependency graph; and
locating the graph node in the dependency graph based on the identifier.

7. The method of claim 6, further comprising:
using the dependency in the dependency graph to determine an interface to an implementation of the interface, wherein the implementation is the second class.

8. The method of claim 1, wherein creating the first object comprises:
creating the first object in the second compute node at runtime of the application.

9. The method of claim 1, wherein creating the first object comprises:
determining a property value for the first object; and
creating the first object using the property value.

10. The method of claim 1, wherein creating the first object comprises:
injecting the second object into the first object, wherein injecting allows the first object to use the second object.

11. The method of claim 1, wherein creating the first object comprises:
injecting a third object into the second object, wherein injecting allows the first object to use the third object.

12. The method of claim 11, wherein injecting comprises:
injecting the third object into the second object; and
injecting the second object into the first object.

13. The method of claim 1, further comprising:
defining a lifetime for the first object, wherein the lifetime determines how to process another request to create the first object.

14. The method of claim 1, wherein the dependency graph is created based on scanning the classes of the application and determining dependencies from one class to another class or interface that are commonly defined.

15. The method of claim 1, further comprising:
receiving a task from the first compute node;
performing the task using the first object to determine an output; and
providing the output to the first compute node.

16. The method of claim 1, wherein graph nodes in the dependency graph are assigned unique identifiers to allow for serialization of the information identifying the graph node and identification of the graph node in the dependency graph.

17. A non-transitory computer-readable storage medium containing instructions for performing a service in a system including a plurality of compute nodes, wherein the instructions, when executed, control a computer system to be operable for:
installing, by a second compute node in the plurality of compute nodes, a dependency injection container to manage a dependency graph of dependencies for classes in an application, wherein the dependency injection container is determined from a first compute node in the plurality of compute nodes that manages performing the service with the plurality of compute nodes;
receiving, by the second compute node, a serialized bitstream for information identifying a graph node of a plurality of graph nodes in the dependency graph from the first compute node, wherein the information is received to create a first object on the second compute node that has been created on the first compute node;
deserializing the serialized bitstream to determine the information identifying the graph node;
using, by the second compute node, the information to determine a first class in the classes for the graph node in the dependency graph and a dependency on a second class in the classes; and
creating, by the second compute node, the first object of the first class with the dependency on a second object of the second class on the second compute node.

18. A method for performing a service in a system including a plurality of compute nodes, the method comprising:
installing, by a first compute node in the plurality of compute nodes, a dependency injection container to manage a dependency graph of dependencies for classes in an application, wherein the first compute node in the plurality of compute nodes manages performing the service with the plurality of compute nodes;
receiving, by the first compute node, an indication to create a first object;
creating, by the first compute node, the first object of a first class in the classes using a dependency on a second object of a second class in the classes; and
sending, by the first compute node, a serialized bitstream for information identifying a graph node in the dependency graph to a second compute node in the plurality of compute nodes, wherein the second compute node has a dependency injection container from the first compute node installed, and deserializes the serialized bitstream and uses the information identifying the graph node to determine the first class for the graph node in the dependency graph from the dependency injection container and the dependency on the second class; and
sending, by the first compute node, a task for the service to the second compute node, wherein the task is performed by the first object on the second compute node.

19. The method of claim 18, wherein the information identifying the graph node comprises first information, the method further comprising:
sending second information for the dependency injection container from the first compute node to the second compute node, wherein the second information allows the installing of the dependency injection container at the second compute node.

20. The method of claim 18, wherein sending the information identifying the graph node to the second compute node comprises:
serializing the information identifying the graph node; and
sending the serialized bitstream to the second compute node.

* * * * *